United States Patent [19]

Takasaki et al.

[11] Patent Number: 5,172,919
[45] Date of Patent: Dec. 22, 1992

[54] APPLIANCE FOR PREVENTING WATER FROM LEAKING THROUGH JOINT

[75] Inventors: Kazuhiro Takasaki; Michiyoshi Terauchi; Hiroshi Shinjo, all of Tokyo, Japan

[73] Assignee: C. I. Kasei Co., Ltd., Tokyo, Japan

[21] Appl. No.: 656,327

[22] Filed: Feb. 19, 1991

[30] Foreign Application Priority Data

Feb. 22, 1990 [JP] Japan .................... 2-16150[U]

[51] Int. Cl.⁵ ................................ F16J 15/10
[52] U.S. Cl. .......................... 277/227; 285/925
[58] Field of Search ............ 277/227, 235 R, 180; 285/910, 925; 52/169.14

[56] References Cited

U.S. PATENT DOCUMENTS

| | | | |
|---|---|---|---|
| 2,402,114 | 6/1946 | Le Clair | 277/235 R X |
| 3,099,110 | 7/1963 | Spaight | 277/227 X |
| 3,379,480 | 4/1968 | Storm | 277/235 R X |
| 3,561,177 | 2/1971 | Agro et al. | 52/169.14 X |
| 3,576,330 | 4/1971 | Gard | 277/235 R |
| 3,834,744 | 9/1974 | Masatchi | 277/235 R X |
| 4,361,348 | 11/1982 | Rapp et al. | 285/910 X |
| 4,449,713 | 5/1984 | Ishido | 277/227 X |
| 4,558,875 | 12/1985 | Yamaji et al. | 277/227 |
| 4,581,864 | 4/1986 | Shvakhman et al. | 52/169.14 |
| 4,827,834 | 5/1989 | Leigh-Monstevens | 277/235 R X |

FOREIGN PATENT DOCUMENTS 0147764 10/1985 European Pat. Off.
2214994 9/1989 United Kingdom.

OTHER PUBLICATIONS

Patent Abstracts of Japan, JP-A 1-263389, vol. 14, No. 23 (M-920) [3966], Jan. 17, 1990.

Primary Examiner—William A. Cuchlinski, Jr.
Assistant Examiner—Scott W. Cummings
Attorney, Agent, or Firm—Sughrue, Mion, Zinn, Macpeak & Seas

[57] ABSTRACT

A seal, constituted by a water-expansible portion and a water-unexpansible portion, prevents water from leaking in a construction joint. The expansible portion surrounds the unexpansible portion everywhere except on a side of the unexpansible portion which is adhered to one of two mutually facing surfaces of the construction joint. The unexpansible portion is sized, relative to the overall size of the seal, particularly in the width dimension, so that it adheres with sufficient strength to one of the mutually facing surfaces of the construction joint so as not to become pulled off in use. An effective seal thus is maintained even in a swollen state.

12 Claims, 4 Drawing Sheets

APPLIANCE FOR PREVENTING WATER FROM LEAKING THROUGH JOINT

BACKGROUND OF THE INVENTION

1. Field of the Invention

The present invention relates to a sealing device for preventing water from leaking through a joint constituted by the coupled surface of a civil engineering component such as a shield segment, a concrete product for a manhole, a culvert, and so forth.

2. Summary of the Related Art

A shield tunnel excavated in the ground of an urban area is made of a large number of concrete segments 1 formed as modules to constitute the inside surface of a portion of the tunnel, as shown in FIGS. 1 and 2. At the time of the building of the tunnel, the segments 1 are closely coupled to each other both in the circumferential direction a of the tunnel and in the longitudinal direction b thereof. Each of the segments 1 has front and rear flanges 2 and 3 extending in the circumferential direction a of the tunnel and located on two of the four edges of the body of the segment, and upper and lower flanges 4 and 5 extending in the longitudinal direction b of the tunnel and located on the other two of the four edges, so that the segment is formed as a container. When the segments 1 are coupled to each other, the mutually adjacent flanges 2 and 3 thereof are laid on each other and then are tightened together by coupling bolts 6, and the other mutually adjacent flanges 4 and 5 of the segments are also laid on each other and then are tightened together by other coupling bolts 6.

Since it is necessary to seal the joint of the mutually coupled surfaces of the mutually tightened flanges in order to prevent spring water from leaking into the interior of the tunnel, a band-like seal 8 is secured to at least one of the mutually coupled surfaces facing the gap 7 between the surfaces. The seal 8 is made of a conventional water-expansible material such as a mixture which includes a highly water-absorbing resin and a synthetic rubber and is subjected to forming and vulcanizing. The seal 8 is formed as a single layer of the material. When the water W enters the gap 7, the seal 8 of the single layer is expanded with the water, thus sealing the gap so as to prevent the water from leaking into the interior of the tunnel through the gap.

However, since the water-expansible material is less tenacious and elastic than an ordinary water-unexpansible rubber, the thickness of the seal 8 needs to be larger in order to prevent the water from leaking into the interior of the tunnel through the gap 7 before the seal absorbs the water and is expanded therewith. For that reason, not only is the cost of the seal 8 increased, but also it is likely that the projecting surface of the seal will collide with other components of the tunnel, and cause the seal sticking surface of the flange of the segment 1 to drop off during conveyance or the like. This is a problem.

When the seal 8 is expanded with the water W, the sealant becomes much less tenacious. The expansion takes place in three dimensions. In particular, the sealant 8 expends by a relatively greater amount in the longitudinal directions of the gaps 7 extending between the segments 1 in the circumferential and longitudinal directions of the tunnel. For that reason, if the mutually adjacent segments 1 become displaced because of vibration or the like, the expanded seal 8 can break or crack in part, or can separate from the seal sticking surface of the flange of the segment and drop off. This also is a problem.

In order to solve the problems mentioned above, the present inventor proposed a combined seal 9 shown in FIGS. 3(A) and 3(B) and composed of a water-expansible material and a water-unexpansible rubber, and conducted various experiments and studies on the seal. A similar seal is disclosed in copending, commonly assigned application Ser. No. 07/629,173. The seal 9 includes a band-like expansible central portion 10 made of the water-expansible material, and unexpansible lateral portions 11 made of the water-unexpansible rubber and extending on both the side surfaces of the central portion.

When the gap 7 which is formed between the flanges 4 and 5 of segments 1 and in which the seal 9 is provided is at the initial stage of spreading as shown in FIG. 3(A), water W comes into contact with only the unexpansible portion 11 so that it takes some time for the water to enter into the expansible portion 10 to expand it to stop the water. For that reason, there is a problem that the water W is likely to leak through the gap 7 along the seal 9 at the initial stage of spreading of the gap. FIG. 3(B) shows the later state of spreading of the gap 7. When the expansible central portion 10 is expanded with the water W, the portion pushes and moves both the lateral unexpansible portions 11. For that reason, there are problems in that the restriction of the displacement of the seal 9 in the direction of the width thereof is less than that of the displacement in the longitudinal direction thereof, and the stuck bottom of the seal 9 is likely to separate from the segment.

SUMMARY OF THE INVENTION

The present invention was made in order to solve the above-mentioned problems. Accordingly, it is an object of the invention to provide a sealing device for preventing water from leaking through a joint. The device employs a combined seal. Although the conventional single seal formed as the single layer of the water-expansible material and shown in FIG. 2 has the greatest disadvantage with regard to the expansion of the seal in three dimensions, the combined seal is improved with regard to the expansion in three dimensions by controlling the expansion, so as to provide a good water leak preventing property. The strength of sticking of the surface of the combined seal to its associated flange, or surface of the joint is enhanced. The water leak preventing property of the adhered surface of the seal is improved. The combined seal also has an enhanced water leak preventing property responsive to the change in the gap between the mutually facing surfaces of the joint.

For example, the combined seal is interposed between the mutually facing surfaces of the joint, and has its adhered surface adhered to at least one of the surfaces of the joint. The seal includes an expansible portion made of a water-expansible material capable of being expanded by absorbing the water, and an unexpansible portion made of a water-unexpansible rubber virtually incapable of being expanded with the water. The expansible and the unexpansible portions are laid one on the other in continuous fashion in the longitudinal direction of the seal so that the portions constitute the seal in the form of a band. A part of the unexpansible portion is exposed at the adhered surface of the seal continuously along the longitudinal direction of the seal. The expansible portion extends on both the side surfaces of the unexpansible portion and on the inner surface thereof, which is located opposite the stuck surface of the seal. Since the unexpansible portion is disposed at the central part of the adhered surface of the seal, it is possible to control the expansion of the seal with regard to the directions, something which cannot be done with the conventional single seal shown in FIG. 2, to make the expansion effective in the direction of the thickness of the seal to prevent the water from leaking through the joint and to maintain the strength of the material of the unexpansible portion. The water leak preventing property of the seal thus is enhanced.

Besides, the expansion of the seal is controlled with regard to the width thereof to a greater extent than that of the conventional combined seal shown in FIGS. 3(A) and 3(B). Since the unexpansible portion partially is exposed at a central part of the adhered surface of the seal, the adhering strength of the seal is retained. Since the expansible portion constitutes a part of the adhered surface of the seal as well as the unexpansible portion does, the water leak preventing property of the adhered surface is kept secure. The seal thus is improved with regard to the strength of the sticking of the adhered and the water leak preventing property thereof in a well balanced manner. As a result, the present invention is capable of preventing the water effectively from leaking through the joint.

DETAILED DESCRIPTION OF THE PREFERRED EMBODIMENTS

Embodiments of the present invention now will be described in detail with reference to the drawings attached hereto.

Figure 4:
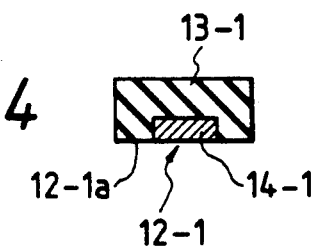
FIG. 4 is a sectional view of the seal of a water present invention according to an embodiment of the present invention.
Figure 5A:
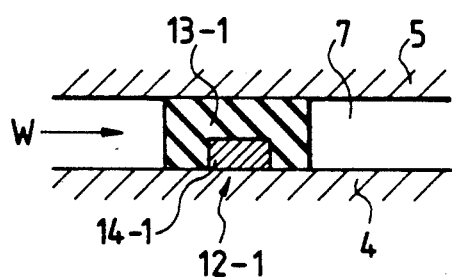
FIGS. 5(A) and 5(B) are sectional views of a device employing the seal shown in FIG. 4.
Figure 5B:
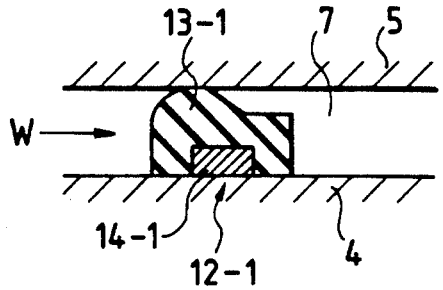

FIGS. 4, 5(A) and 5(B) show the seal 12-1 of an sealing device according to one of the embodiments for preventing water from leaking through a joint. The contour of the seal 12-1 is the same as that of a simple band. The seal 12-1 includes an expansible portion 13-1 made of a water-expansible material capable of being expanded by absorbing the water, and an unexpansible portion 14-1 made of a water-unexpansible rubber virtually incapable of being expanded with water. The portions 13-1 and 14-1 are laid on each other continuously in the longitudinal direction of the seal 12-1 so that the portions constitute the seal in the form of the band. A part of the unexpansible portion 14-1 is exposed at the adhered surface 12-1a of the seal 12-1 continuously in the longitudinal direction thereof. The expansible portion 13-1 extends on both side surfaces of the unexpansible portion 14-1 and the inner surface thereof, which is located opposite the stuck surface 12-1a of the seal 12-1.

The seal 12-1 is provided between mutually facing surfaces 4 and 5 of the joint, the surface 12-1a being adhered to at least one of the surfaces of the joint, as shown in FIG. 4.

The width of the exposed outer surface of the unexpansible portion 14-1 relates to the maintenance of the strength of the sticking of the seal 12-1 to the surface of the joint and relates to the maintenance of the water leak preventing property of the seal. If the width is less than 10% of that of the seal 12-1, the adhering strength cannot be maintained. If the width of the unexpansible portion 14-1 is more than 90% of that of the seal 12-1, the water leak preventing property of the seal cannot be secured. For these reasons, the width of the unexpansible portion 14-1 is set to be 10% to 90% of that of the seal 12-1, preferably 25% to 75% thereof.

If the thickness of the unexpansible portion 14-1 is less than 3% of that of the seal 12-1, the expansion of the seal cannot be controlled well in all three dimensions thereof. If the thickness of the unexpansible portion 14-1 is more than 70% of that of the seal 12-1, the expansion property of the seal is lowered, making it impossible to effectively prevent water from leaking through the gap between the surfaces of the joint. For these reasons, the thickness of the unexpansible portion 14-1 at the adhered surface 12-1a of the seal 12-1 is set to be 3% to 70%, preferably 5% to 50%, of the thickness of the seal 12-1.

The water W entering the gap 7 between the mutually facing surfaces 4 and 5 of the joint comes into contact with the side surface of the expansible portion 13-1 of the seal 12-1 from the beginning of the installation of the appliance. When the gap 7 has spread from a state shown in FIG. 5(A) to a state shown in FIG. 5(B), the unexpansible portion 14-1 constituting the central part of the stuck surface 12-1a of the seal 12-1 acts to control the direction of the expansion of the expansible portion 13-1 of the seal to improve its water leak preventing property responsive to the change in the gap. Since the unexpansible portion 14-1 constitutes only a part of the adhered surface 12-1a of the seal 12-1 and is surrounded by the expansible portion 13-1 with the exception of the outer surface of the unexpansible portion, all the surfaces of the seal are effectively.

Since the unexpansible portion 14-1 is disposed at the central part of the stuck surface 12-1a of the seal 12-1, the expansion of the seal is controlled in three dimensions to make the expansion effective in the direction of the thickness of the seal, and thus prevent the water from leaking through the gap 7 of the joint and maintain the strength of the material of the seal. The water leak preventing property of the seal 12-1 thus is enhanced. Since the unexpansible portion 14-1 is exposed partially at the central part of the stuck surface 12-1a of the seal 12-1, the adhering strength of the seal is maintained. Since the expansible portion 13-1 constitutes a part of the stuck surface 12-1a of the seal 12-1, as does the unexpansible portion 14-1, the water leak preventing property of the adhered surface is kept secure. The seal 12-1 thus is improved with regard to the strength of the sticking of the stuck surface 12-1a and the water leak preventing property thereof in a well balanced manner. Therefore, the appliance is effective in preventing water from leaking through the gap 7 of the joint.

The surface of the seal 12-1, which is located opposite the adhered surface 12-1a thereof, may be adhered to the corresponding surface of the joint by an adhesive.

Figure 6A:
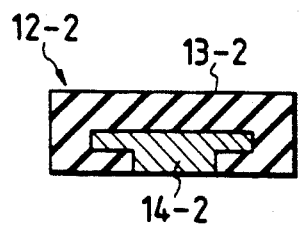
FIGS. 6(A) through 6(T) are sectional views of the seals of water leak prevention devices according to other embodiments of the present invention.
Figure 6B:
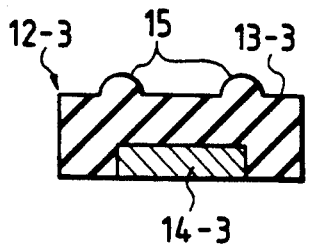
Figure 6C:
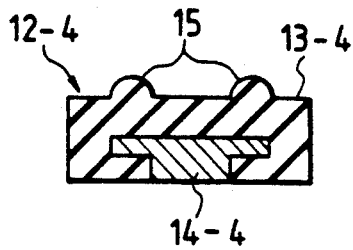
Figure 6D:
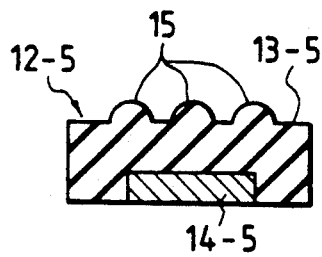
Figure 6E:
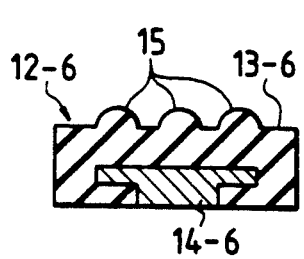
Figure 6F:
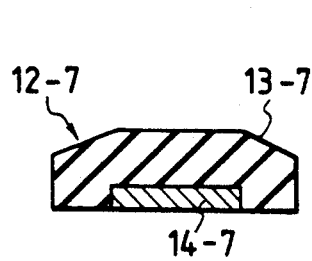
Figure 6G:
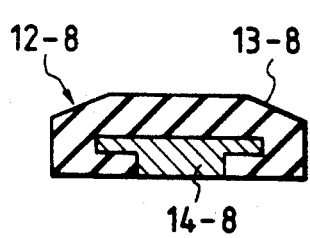
Figure 6H:
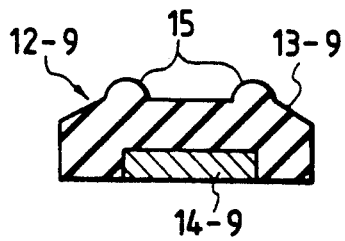
Figure 6I:
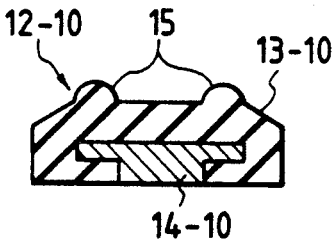
Figure 6J:
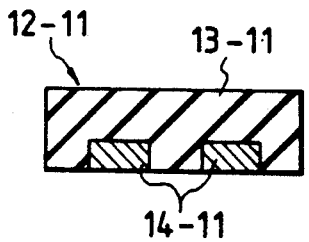
Figure 6K:
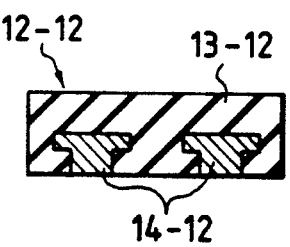
Figure 6L:
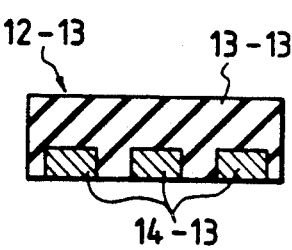
Figure 6M:
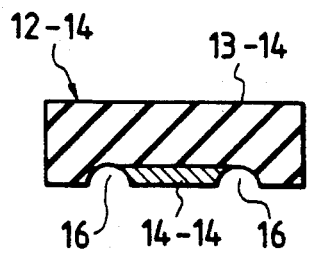
Figure 6N:
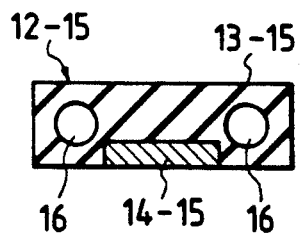
Figure 6O:
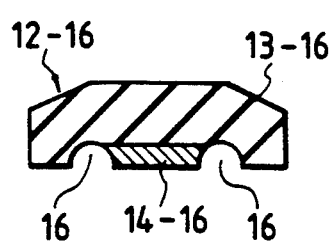
Figure 6P:
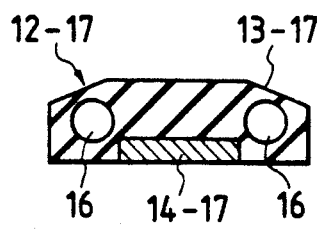
Figure 6Q:
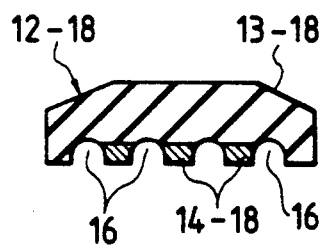
Figure 6R:
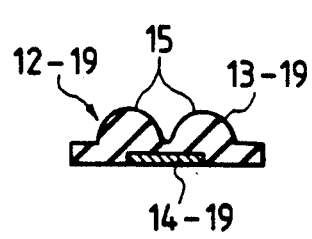
Figure 6S:
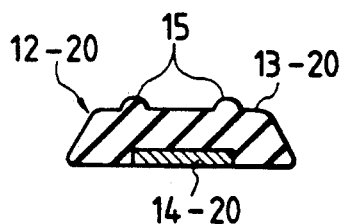
Figure 6T:
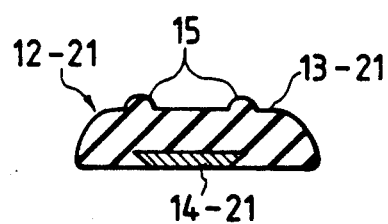

FIGS. 6(A) through 6(T) show seals 12-2 through 12-21 of appliances according to other embodiments for preventing water from leaking through joints. The seals include respective expansible portions 13-2 through 13-21 and unexpansible portions 14-2 through 14-21.

The cross section of each of the unexpansible portions 14-2, 14-4, 14-6, 14-8, 14-10, and 14-12 of the seals 12-2, 12-4, 12-6, 12-8, 12-10, and 12-12, is T shaped so that the expansible portion has an inner part of larger width and an outer part of smaller width in the form of a comb. Because of that constitution, the expansion of the expansible portion of the seal is controlled better in the directions thereof, and the coupling of the expansible and the unexpansible portions of the seal is reinforced. The unexpansible portion 14-21 of the seal 12-21 of FIG. 6(T) is shaped like a trapezoid, and has the same effect as those of FIGS. 6(A), 6(C), 6(E), 6(G), 6(I), and 6(K) just discussed.

Each of the seals 12-3, 12-4, 12-5, 12-6, 12-9, 12-10, 12-19, 12-20, and 12-21 has one or more small projections 15 on the surface of the seal, which is located opposite the adhered surface of the seal. Because of that constitution, the tightening force on a bolt and nut for fitting the seal in the joint without leaving an opening between the seal and each of segments can be reduced, and the water leak preventing property of the seal at the initial stage of service thereof is enhanced.

The expansible portion of each of the seals 12-14, 12-15, 12-16, 12-17, and 12-18 has openings 16, so that the elasticity of the seal in the tightening thereof is enhanced, and the quantity of the expansible material thereof may be reduced. Though not specifically shown, the seals 12-20 and 12-21 also may be provided with such openings 16.

The cross section of the upper part of each of the seals 12-7, 12-8, 12-9, 12-10, 12-16, 12-17, 12-18, and 12-20 is trapezoidally shaped or almost trapezoidally shaped so that the elasticity of the seal in the tightening thereof is enhanced, and the quantity of the expansible material thereof is reduced.

Each of the seals 12-11, 12-12, 12-13, and 12-18 has a plurality of unexpansible portions 14-11, 14-12, 14-13, or 14-18 located at an interval from each other and partially constituting the adhered surface of the seal. Because of that construction, the seal is improved with regard to adhering strength of the seal and the water leak preventing property thereof at the adhered surface thereof in a better balance manner.

The favorable effects achieved by the invention may be observed by reference to the following comparative examples.

EXAMPLE 1

The combined seal member having a thickness of 6 mm and a width of 20 mm, as shown in FIG. 6(B), was prepared by extrusion, and was subjected to a hydraulic press test.

After the seal was attached with adhesive for 24 hours to two round steel flanges with a groove having a depth of 3.5 mm and a width of 25 mm, a spacer having a thickness of 3 mm was interposed between the two flanges and then was secured thereto with bolts. As soon as water was inserted into the flanges, pressure was applied to the flanges. If water did not leak through, then the size of the spacer was increased 1 mm at a time. If water did leak, the seal was left for 24 hours as is and the next day pressure was applied to the flanges. The the water leak preventing property was examined in this manner.

Water did not leak under hydraulic pressure of 10 kgf/cm$^2$ after water was inserted in the flanges for 7 days and then a spacer was interposed between the flanges for the application of pressure.

COMPARATIVE EXAMPLE 1

Figure 7:
FIG. 7 is a sectional view of another conventional seal.

The combined seal, having a thickness of 6 mm and a width of 20 mm, as shown in FIG. 7, was prepared by extrusion, and then the same hydraulic press test was conducted.

Water leaked under an hydraulic pressure of 5 kgf/cm$^2$ after water was inserted into the flanges for 7 days and a spacer having a thickness of 5 mm was interposed between the flanges.

EXAMPLE 2

The combined seal having a thickness of 3 mm and a width of 31 mm, as shown in FIG. 4, was prepared by extrusion, and a hydraulic press test was conducted.

After the seal was attached to two round steel flanges with a groove having a thickness of 3 mm and a width of 31 mm through adhesive for 24 hours, a spacer having thickness of 5 mm was interposed between the flanges, and then secured with bolts.

Water did not leak under hydraulic pressure of 10 kgf/cm$^2$ after water was inserted into the flanges for 14 days, and then pressure was applied.

COMPARATIVE EXAMPLE 2

Figure 1:
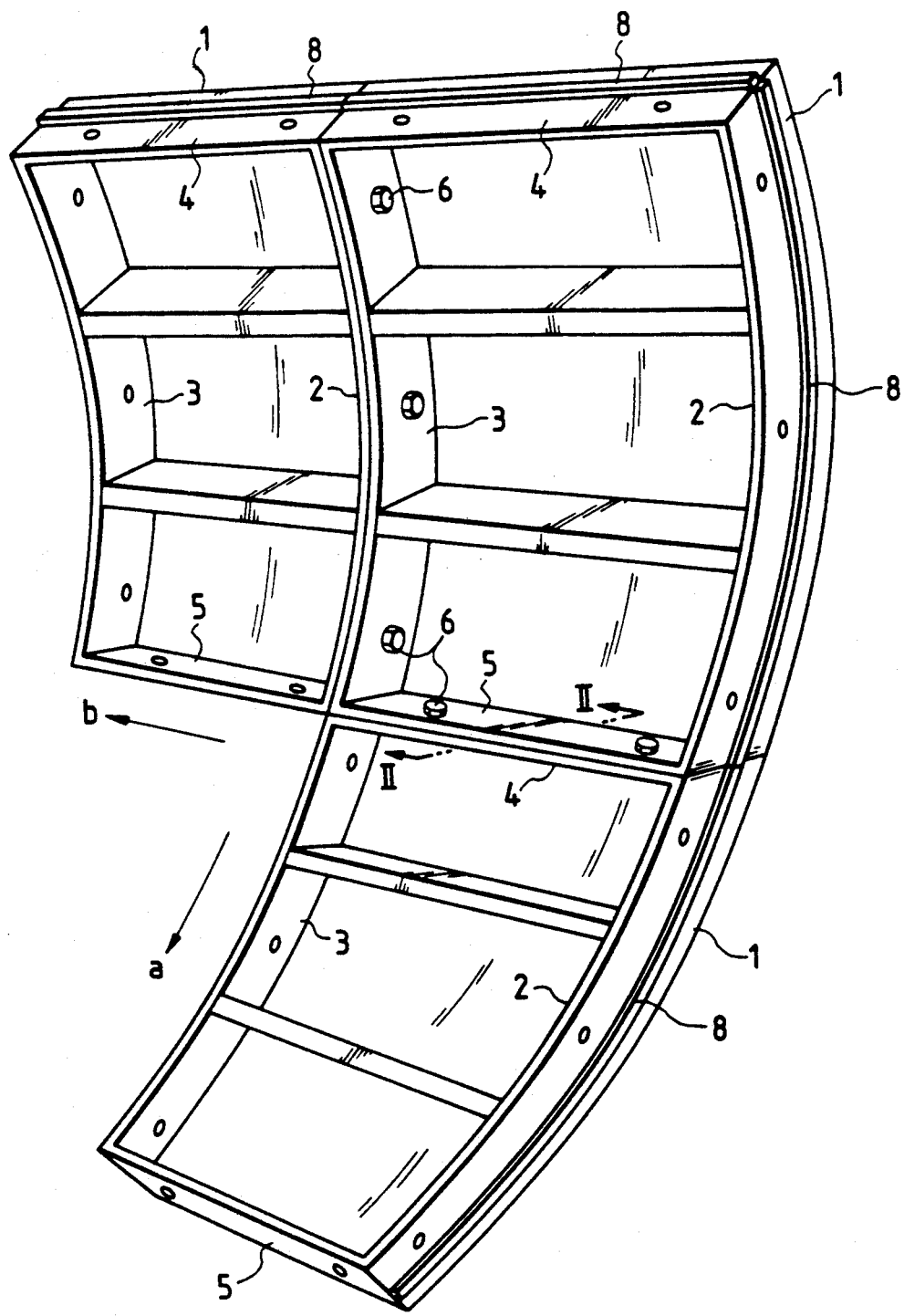
FIG. 1 is a perspective view of tunnel segments in an assembled state.
Figure 2:
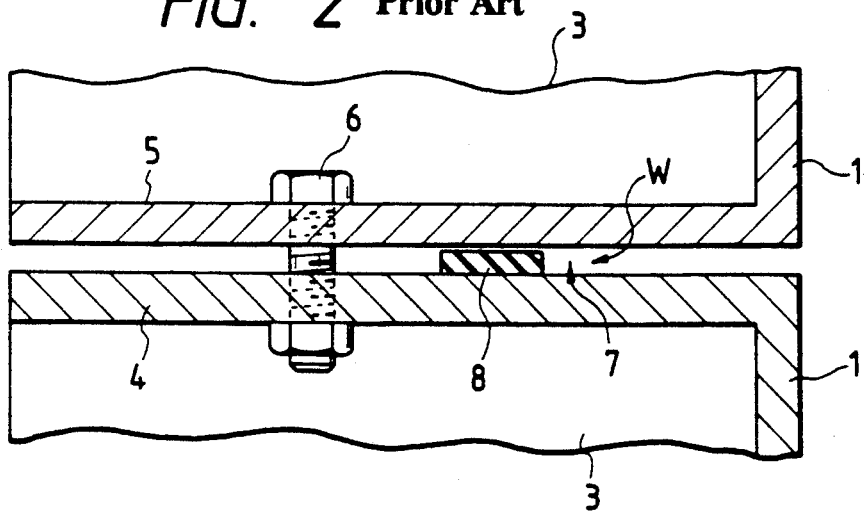
FIG. 2 is an enlarged sectional view of the segment provided with a conventional seal.
Figure 3A:
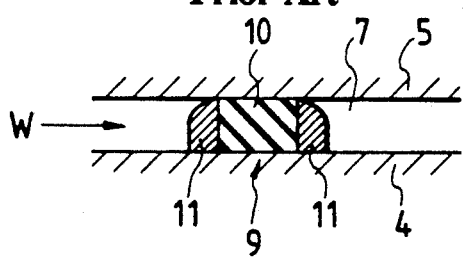
FIGS. 3(A) and 3(B) are sectional views of a water leak prevention appliance employing another conventional seal.
Figure 3B:
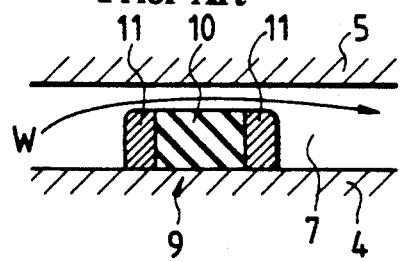

The seal of a single structure having a thickness of 3 mm and a width of 31 mm, as shown in FIG. 2, was prepared by extrusion, and the same hydraulic press test as Example 2 was conducted.

After water was inserted into the flanges for 14 days, and then pressure was applied, the seal came off from the groove and water leaked under hydraulic pressure of 6 kgf/cm$^2$.

As can be seen from the foregoing, the invention provides favorable results as compared with conventional approaches.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. In a sealing device for preventing water from leaking through a joint constituted by two mutually facing surfaces, a seal adhered to at least one of said mutually facing surfaces which constitutes an adhered surface, said seal comprising:
   at least one expansible portion made of a water-expansible material capable of being expanded by absorbing said water; and
   an unexpansible portion made of a water-unexpansible rubber virtually incapable of being expanded with said water;
   wherein said expansible portion and said unexpansible portion are laid on each other continuously along a longitudinal direction of said seal so that said portions constitute said seal in the form of a band; a part of said unexpansible portion is exposed at said adhered surface continuously in said longitudinal direction; and said expansible portion surrounds said unexpansible portion on all sides thereof except for said part of said unexpansible portion which is adhered to said adhered surface.

2. A sealing device as claimed in claim 1, wherein said unexpansible portion is in the form of a T-shape.

3. A sealing device as claimed in claim 1, wherein said expansible portion has at least one salient portion extending in a direction from said adhered surface to the other of said mutually facing surfaces.

4. A sealing device as claimed in claim 1, wherein a plurality of said unexpansible portions are provided, each being adhered to said adhered surface, said expansible portion surrounding said unexpansible portions.

5. A sealing device as claimed in claim 1, wherein said expansible portion has at least one opening.

6. A sealing device as claimed in claim 5, wherein said at least one opening is provided at an interior of said expansible portion.

7. A sealing device as claimed in claim 6, wherein said at least one opening is provided directly facing said adhered surface.

8. A sealing device as claimed in claim 1, wherein said unexpansible portion is in the form of a trapezoid, in cross section.

9. A sealing device as claimed in claim 1, wherein said unexpansible portion has a width in a range from 10% to 90% of the overall width of said seal.

10. A sealing device as claimed in claim 9, wherein said unexpansible portion has a width in a range from 25% to 75% of said overall width of said seal.

11. A sealing device as claimed in claim 1, wherein a thickness of said unexpansible portion is in a range of 3% to 70% of an overall thickness of said seal.

12. A sealing device as claimed in claim 11, wherein said thickness of said unexpansible portion is in a range of 10% to 50% of said overall thickness of said seal.

* * * * *